(12) United States Patent
Smith

(10) Patent No.: US 12,066,098 B2
(45) Date of Patent: Aug. 20, 2024

(54) TOOLS AND METHOD FOR REPAIR OF SHIFT CABLE ENDS IN VARIOUS MOTOR VEHICLES

(71) Applicant: Loring Smith, Lakeland, FL (US)

(72) Inventor: Loring Smith, Lakeland, FL (US)

( * ) Notice: Subject to any disclaimer, the term of this patent is extended or adjusted under 35 U.S.C. 154(b) by 65 days.

(21) Appl. No.: 17/703,445

(22) Filed: Mar. 24, 2022

(65) Prior Publication Data

US 2022/0307589 A1    Sep. 29, 2022

Related U.S. Application Data

(60) Provisional application No. 63/166,672, filed on Mar. 26, 2021.

(51) Int. Cl.
*F16H 59/02* (2006.01)
*B25B 27/06* (2006.01)
*B25B 27/28* (2006.01)

(52) U.S. Cl.
CPC ......... *F16H 59/0278* (2013.01); *B25B 27/06* (2013.01); *B25B 27/28* (2013.01)

(58) Field of Classification Search
CPC ......... B25B 27/28; B25B 27/06; B25B 27/02; Y10T 29/53909; Y10T 29/53913; Y10T 29/53917; F16H 2059/0269; F16C 43/00; F16C 43/02; F16C 43/04
See application file for complete search history.

(56) References Cited

U.S. PATENT DOCUMENTS

2015/0330499 A1* 11/2015 Smith ............... F16H 61/36
29/898.07

* cited by examiner

*Primary Examiner* — Tyrone V Hall, Jr.
(74) *Attorney, Agent, or Firm* — Todd A. Jennings

(57) ABSTRACT

The repair of shift cable ends in various motor vehicles without the replacement of the entire shift cable is accomplished using a specialized bushing that operably couples the shift lever and shift cable end. In particular embodiments, the shift cable end is seated in an installation tool and a specialized bushing is inserted into the shift cable end by applying a compressive force to the bushing and the installation tool. The installation tool is removed and the shift lever is inserted into the bushing. The bushing has a coupling means to simulate the factory installed coupling mechanism, a securing means for maintaining the bushing's alignment and securing it within the shift cable end, and a pressure-relief means for relieving pressure within the bushing as the lever is inserted into the bushing. In some embodiments, the bushing has a compression means for allowing the bushing to be easily compressed into the shift cable end without deformation.

7 Claims, 13 Drawing Sheets

TOOLS AND METHOD FOR REPAIR OF SHIFT CABLE ENDS IN VARIOUS MOTOR VEHICLES

CROSS-REFERENCES TO RELATED APPLICATIONS

This application claims the priority and the benefit of U.S. Provisional Application No. 63/166,672, filed Mar. 26, 2021, entitled "Tools and Method for Installation of a Transmission Shift Cable in Certain Motor Vehicles"

STATEMENT REGARDING FEDERALLY SPONSORED RESEARCH

Not Applicable.

NAMES OF PARTIES TO JOINT RESEARCH AGREEMENT

Not Applicable

REFERENCE TO A SEQUENCE LISTING

Not Applicable.

BACKGROUND OF THE INVENTION

(1) Field of Invention

The present invention comprises a method for installing a bushing into the end of a transmission shift control linkage of various motor vehicles without damaging the shift cable end or the bushing. The transmission shift control linkage of many motor vehicles generally consists of a shift cable that connects the gear selector or shift lever to the motor vehicle's transmission. The shift cable end is coupled with the gear selector or shift lever via a bushing that allows for the smooth operation of the shift linkage. The bushing installed in the shift cable end of various motor vehicles consists of plastic that dries, rots and becomes brittle over time. The degradation or failure of the bushing allows the shift cable end to become decoupled from the gear selector or shift lever, making it impossible for the operator of the automobile to engage the shift and the transmission.

Presently, the failure of a transmission shift cable end bushing in various motor vehicles requires the removal and replacement of the entire shift cable. This is because the replacement of factory-installed bushings by mechanics generally involves methods utilizing conventional or makeshift tools that deform or otherwise damage the shift cable end or bushing during installation, and fail to properly align the bushing with the shift cable end during installation. This results in a sub-standard repair that may not properly couple the shift cable end with the shift lever. Also, degraded factory-installed bushings are occasionally replaced with non-factory, "universal" bushings. Such bushings are not necessarily intended or tailored for any specific application and, when installed, often fail to properly engage the shift cable end, resulting in a sub-standard repair that may not properly couple the shift cable end with the shift lever. Additionally, the supply and labor costs associated with the replacement of the entire shift cable assembly are substantially greater than the supply and labor costs associated with the replacement of the shift cable bushing.

(2) Background Art

There are a large number of bushings in wide use in many fields. However, there are not many bushings in the art related to the specific use in transmission shift cable assemblies. The present inventor has previously disclosed in U.S. Pat. Nos. 10,619,723, 10,215,273 and application Ser. No. 17/206,001 apparatuses and methods for repairing the couplings between multiple shift cable ends and shift levers in various motor vehicles. However, the shift cable ends and specialized bushings disclosed in these prior patents were materially different from the apparatus and method disclosed in the instant invention.

There are various apparatuses and methods for coupling a spherical or similarly-shaped coupling member within a bushing in other fields and devices. An example of such an apparatus is shown in U.S. Pat. No. 9,681,029, which discloses a bushing that engages a spherical component in a manner that enables the spherical component to be maintained in a static position. This is achieved through the frictional force between the outer surface of the spherical component and the inner surface of the bushing. However, this disclosure is not suited to a shift cable end repair because the mere frictional force between the spherical component of a shift lever and bushing would not maintain the shift lever in a static position. Thus, in lieu of a frictional force, the bushing disclosed in the instant invention carries a coupling aperture and a spherical cavity that work in tandem to hold the spherical component of the shift lever in place.

Another example is U.S. Pat. No. 9,872,710 which discloses a bushing with an expandable and compressible cavity for engaging with and fixing in position a curved coupling member. The bushing disclosed contains a spherical cavity with slots that allow the bushing to be expanded to allow for the insertion of the curved coupling member and then compressed to fix it in place within the bushing. While this bushing fulfills its particular purpose, it is not suited for the instant application because the bushing in the instant invention must be inserted into a fixed, rigid bore within the shift cable end that provides no clearance for the bushing to be expanded and compressed to fix into position the shift lever. U.S. Pat No. 8,277,489 also discloses a bushing that is expanded and compressed to lock a coupling member into place.

U.S. Pat. Nos. 11,022,145 and 8,398,682 disclose bushings having one or more protrusions that axially and rotatably constrain movement of the bushing. The protrusions in this disclosure should be differentiated from the securing members in the instant invention. Specifically, the protrusions disclosed in U.S. Pat. Nos. 11,022,145 and 8,398,682 are designed to extend into pre-existing apertures in a bore, thereby preventing movement of the bushing. Importantly, the securing members in the instant invention are meant to secure a bushing in a bore that does not have pre-existing apertures. Thus, the securing members extend outward from the bottom of the bushing beyond the bore and engage with the outer surface of the bore, thereby working in tandem with a seating member that sits atop the bore to prevent the movement of the bushing.

SUMMARY OF THE INVENTION

Accordingly, it is the object of the present invention to provide specialized tools and methods of use for the prompt installation of a bushing into the transmission shift cable end that does not damage the shift cable end or the bushing, maintains the alignment of the bushing with the shift cable end during the installation, ensures the proper coupling of the shift cable end and shift lever, and avoids the need of replacing the entire shift cable. In accordance with the invention, the proper installation of a transmission shift cable end bushing is achieved by methods utilizing a specialized bushing and tools that allow for the prompt installation of the bushing that protect the bushing from be deformed or damaged by compressive forces applied during installation and ensure the axial alignment of the bushing within the shift cable end throughout the installation.

In particular embodiments of the invention, the object of the invention may be accomplished by seating the shift cable end within an installation cup, placing a protective tool onto one side of a specialized bushing and applying a compressive force to the installation tool and the protective tool press the bushing into the shift cable end. The installation tool and protective tool are removed and the bushing now installed in the shift cable end is pressed over the ball portion of the shift lever to operably couple the shift cable end and shift lever.

Such a bushing may, for example, be comprised of a body having a coupling aperture, or bore, on one side that opens to an inner cavity within the body, a seating member attached to the trailing side of body, a shaft running from the top surface of the seating member to the top of the inner cavity, securing members for securing the bushing within the shift cable end, and a compression mechanism for allowing for the compression of the bushing and the securing members as the bushing is pressed into shift cable end.

The installation tool may, for example, be comprised of a cup having a series of arms extending vertically from its top surface, each arm having an engagement member extending horizontally inward towards the center of the cup from the top portion of the arm. The protective tool may be comprised of a body of the similar shape and size to the seating member of the bushing with a large aperture and an alignment member extending vertically from the center of the body through the aperture.

The bushing, protective tool, and installation tool can be composed of any metal, polymer or copolymer capable of withstanding the physical force applied by a compression tool, such as, for example, polyurethane or polyoxymethylene.

DETAILED DESCRIPTION

Certain factory-installed shift cable ends in various motor vehicles are pre-fitted with a factory-made coupling mechanism for coupling a shift lever to the shift cable end. These factory-made coupling mechanisms, which generally consist of plastic clips or similar appurtenances, degrade over time and their replacement requires the installation of a new shift cable to include a new shift cable end. The replacement of the entire shift cable as a means of repairing a degraded shift cable end coupling mechanism is the generally accepted method because there is no known method for repairing the shift cable end coupling mechanism that ensures the proper coupling of the shift lever and shift cable end. Thus, it remained for the present inventor to recognize that designing a bushing for coupling the shift lever with an existing shift cable end and a method for its installation into a transmission shift cable end would provide an alternative to replacing the entire shift cable end and result in lower supply and labor costs.

Figure 1:
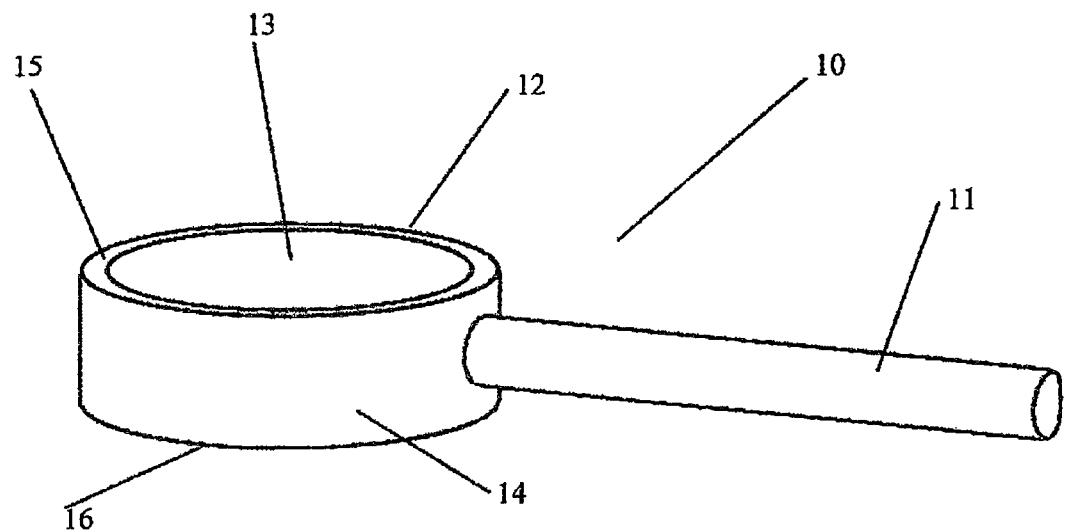
FIG. 1 is a perspective illustration showing the details of an exemplary shift cable end.
Figure 2:
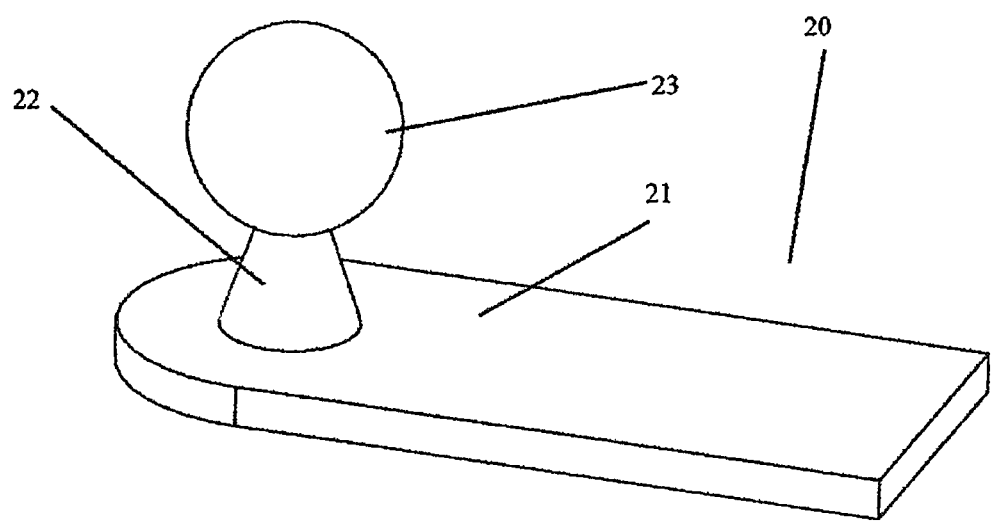
FIG. 2 is a perspective illustration showing the details of an exemplary shift lever.
Figure 3:
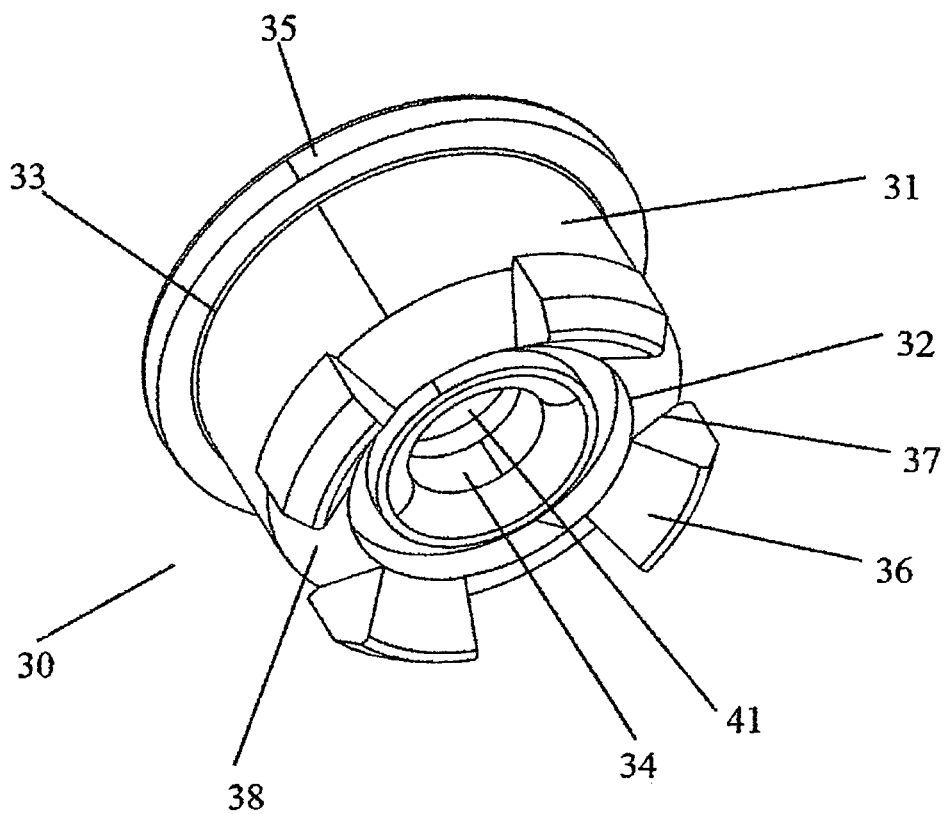
FIG. 3 is a perspective illustration of an exemplary bushing.
Figure 4:
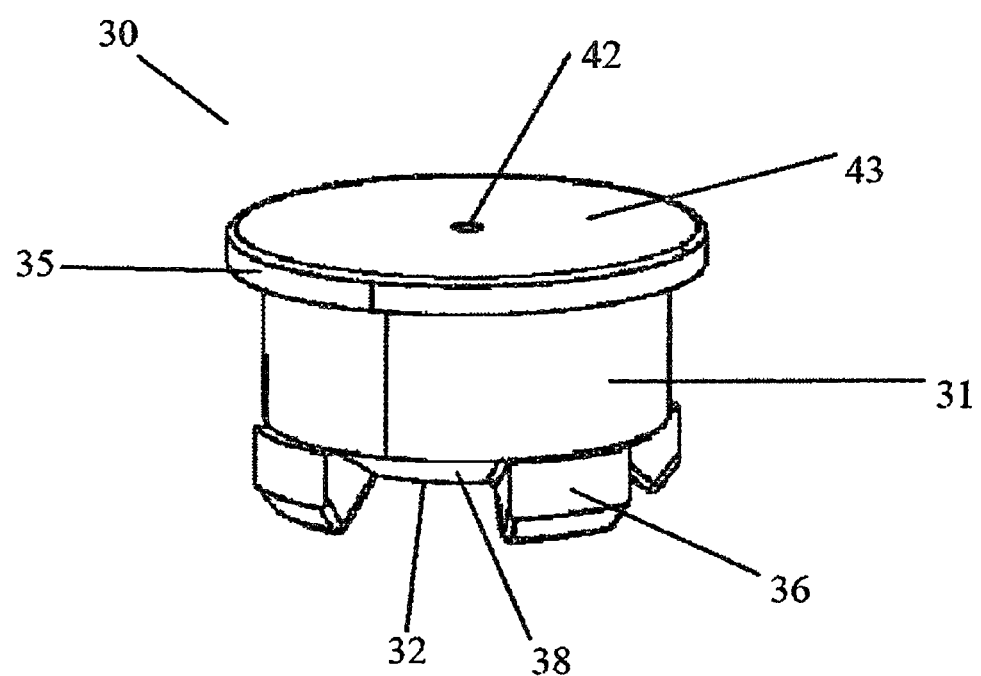
FIG. 4 is a perspective illustration of an exemplary bushing.
Figure 5:
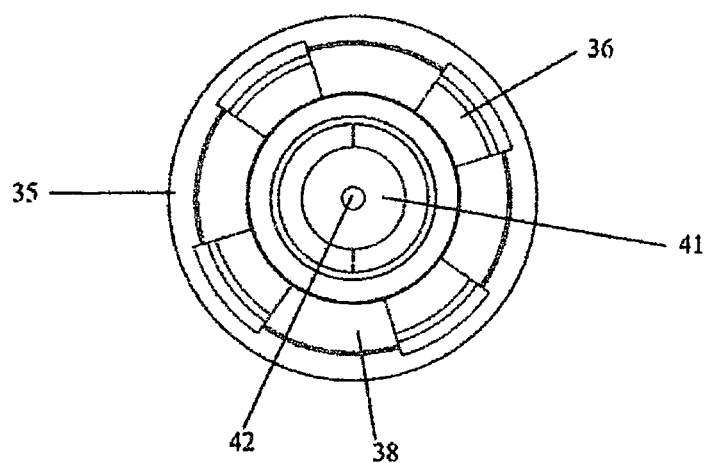
FIG. 5 is a bottom elevation illustration of an exemplary bushing.
Figure 6:
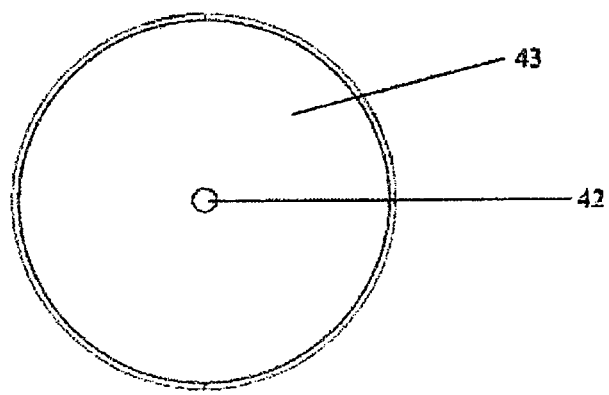
FIG. 6 is a top elevation illustration of an exemplary bushing.
Figure 7:
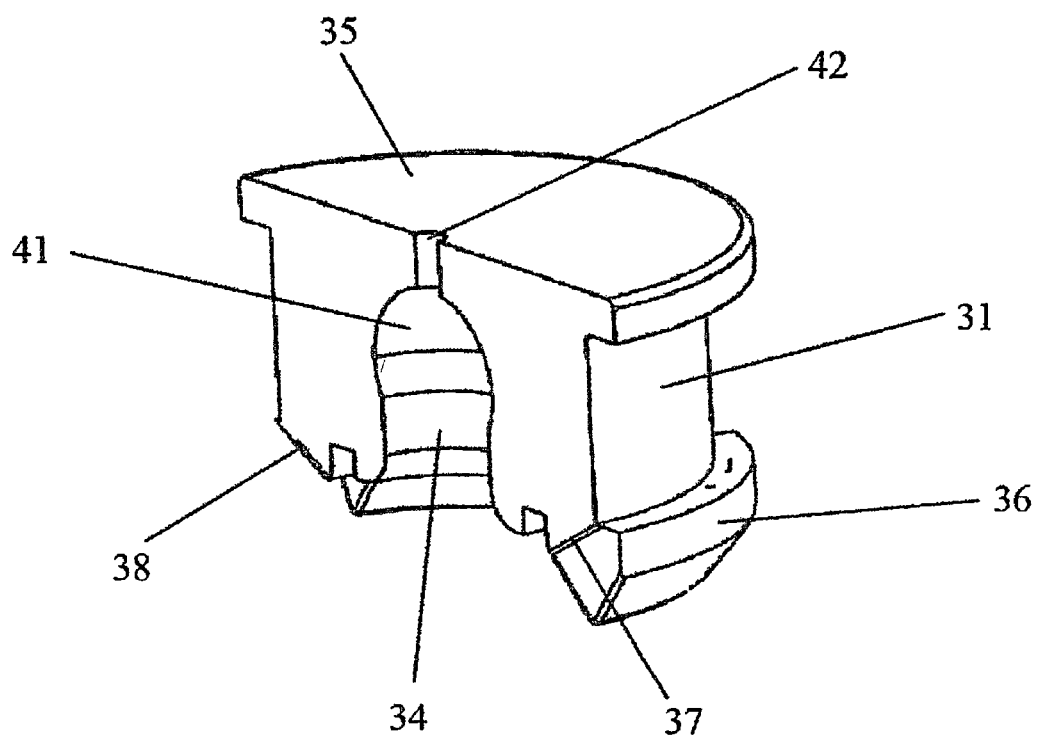
FIG. 7 is cross-sectional illustration of an exemplary bushing.

Referring to FIG. 1, an exemplary transmission shift cable end 10 for a motor vehicle (not shown) is illustrated. The shift cable end 10 operably couples the shift lever 20 with the shift cable (not shown) and allows the shift lever 20 to engage the transmission (not shown). This particular example of a shift cable end 10 includes a connecting member 11 that connects the shift cable (not shown) to the shift cable end 10, and a coupling member 12 adapted to carry a bushing to couple with the shift lever 20. Depending on the motor vehicle, the coupling member may be annular or it may be oblong in a shape. Regardless, the coupling member 12 has an inner surface 13 and an outer surface 14 that forms a coupling aperture 17, and a top surface 15 and a bottom surface 16. The shift lever 20 is inserted into the shift cable end 10 to operably couple with the shift cable (not shown). As seen in FIG. 2, an exemplary shift lever 20 may include an elongated member 21 carrying an arm portion 22 and a ball portion 23.

Referring to FIG. 3, FIG. 4, FIG. 5, FIG. 6 and FIG. 7, an exemplary bushing 30 is illustrated. The bushing 30 includes a body 31 having a leading side 32 and a trailing side 33. When installed, the body 31 sits within the coupling member 12 of the shift cable end 10. The body 31 is of the same shape and approximate depth as the coupling member 12. In this particular example, the body 31 is a cylinder having a diameter approximately equal to the diameter of the inner surface 13 of the coupling member 12 and a length approximately equal to the depth of the coupling member 12. In embodiments of the invention accommodating a shift cable end with an oblong coupling member, the body will oblong rather than spherical. Within the body 31 is a spherical cavity 41 for receiving and engaging with the ball portion 23 of the shift lever 20. The spherical cavity 41 is of a diameter marginally greater than the diameter of the ball portion 23 of the shift lever 20. Access to the spherical cavity 41 is through a bore 34 that runs from the leading side 32 of the body 31 to the spherical cavity 41. The bore 34 is of a diameter less than the diameter of the ball portion 23 of the shift lever 20. During installation the ball portion 23 of the shift lever 20 is squeezed through the bore 34 into the spherical cavity 41. The lesser diameter of the bore 34 acts to hold the ball portion 23 of the shift lever 20 within the spherical cavity 41 during operation of the shift cable.

A seating member 35 is attached to the trailing side 33 of the body 31. The seating member 35 is of the same shape and size as the outer surface 14 of the coupling member 12 and thus is larger than the body 31. The seating member 35 keeps the bushing 30 aligned with the coupling member 12 during installation and operation, and prevents the bushing 30 from being pushed through and dislodged from the coupling member 12. In this particular embodiment, the seating member 35 is a disc with a diameter equivalent to the diameter of the outer surface 14 of the coupling member 12. In embodiments of the invention accommodating a shift cable end with an oblong coupling member, the seating member will be the same shape as the shift cable end. A shaft 42 runs from the top surface 43 of the seating member 35 to the top of the spherical cavity 41. The shaft 42 provides an escape for any air or grease as the ball portion 23 of the shift lever 20 is inserted through the bore 34 and into the spherical cavity 41. In this particular embodiment, the shaft 42 is cylindrical; however, the shaft may be any assortment of shapes that provides a relief for trapped air and grease during installation.

The body 31 also has a securing means for securing the bushing 30 within the coupling member 12. The securing means engages the bottom surface 16 of the coupling member 12 and, in concert with the seating member 35, locks the bushing 30 within the coupling member 12. In particular embodiments of the invention, the securing means is comprised of several securing members 36 extending vertically from the leading side 32 of the body 31. The base 37 of the securing members 36 extends horizontally outward beyond the body 31 such that, when the body 31 is inserted in the coupling member 12, the securing members 36 make contact with the bottom surface 16 of the coupling member 12.

The bushing 30 also has a compression means for allowing the bushing 30 and the securing members 36 to be compressed inward as the bushing 30 is installed into the coupling member 12. The compression means may be comprised of a tapered edge 38 at the leading side 32 of the bushing 30. In the embodiment illustrated in FIG. 3, FIG. 4, FIG. 5 and FIG. 7, the tapered surface 38 extends radially around the leading side 32 of the bushing 30. The tapered surface 38 permits the bushing 30 and securing members 36 to be compressed as the bushing 30 is installed into the coupling member 12 without being permanently deformed. This is essential for the proper coupling and operation of the shift cable end and shift lever. In embodiments of the invention having a cylindrical body, it is necessary that the tapered surface extend radially around the leading side 32 of bushing 30 to provide sufficient compression to avoid the permanent deformation of the bushing 30. However, in other embodiments of the invention, such as one having a body that is oblong, the tapered surface may only need to extend along two opposing edges of the leading side of the bushing.

The bushing 30 may be made of any polymer, copolymer or similar rigid material capable of being molded for the particular application and capable of withstanding the force applied on the bushing by the shift lever 20. The bushings 30 in the illustrative embodiments are made of polyurethane.

Figure 8:
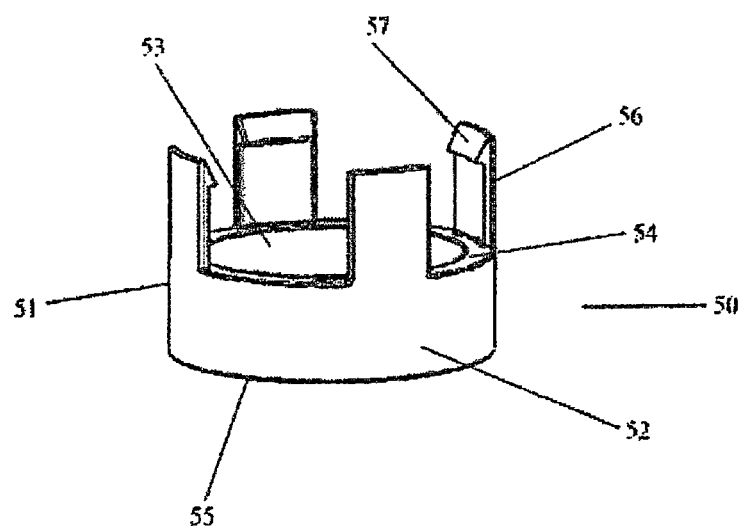
FIG. 8 is a perspective illustration of an exemplary installation tool.

Referring to FIG. 8., an exemplary installation tool 50 is illustrated. In this particular embodiment, the installation tool 50 is comprised of a cup 51 having an outer surface 52, an inner surface 53, a top surface 54 and a bottom surface 55. The diameter of the inner surface 53 of the cup is greater than the diameter of the inner surface 13 of the coupling member 12, but less than the diameter of the outer surface 13 of the coupling member 12. The outer surface 52 of the cup has a diameter greater than the outer surface 14 of the coupling member 12. Several arms 56 extend vertically from the top surface 54 of the cup 51. Each arm 56 has an engagement member 57 that protrudes inward towards the center of the cup 51. In this particular embodiment, there are four arms 56 spaced evenly around the top surface 54 of the cup 51. During installation, the coupling member 12 sits on the top surface 54 of the cup 51 such that an inner portion of the coupling member hangs over the inner surface 53 of the cup 51. The combination of the space between the bottom surface 16 of the coupling member 12 and the bottom surface 55 of the cup 51, and the space created between the inner surface 13 of the coupling member 12 and inner surface 53 of the cup 51, creates a clearance sufficient to accommodate the securing members 36 of the bushing 30 as they are passed through and beyond the coupling member 12 and expand back into place.

The installation tool 50 may be made of any polymer, copolymer or similar rigid material capable of being molded for the particular application and withstanding the forces applied on it during installation. In this particular embodiment, the installation tool is made of polyoxymethylene.

Figure 9:
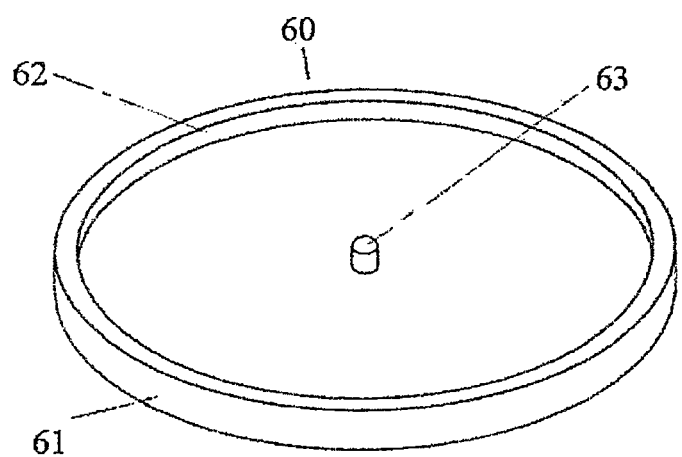
FIG. 9 is a perspective illustration of an exemplary protective tool.
Figure 10:
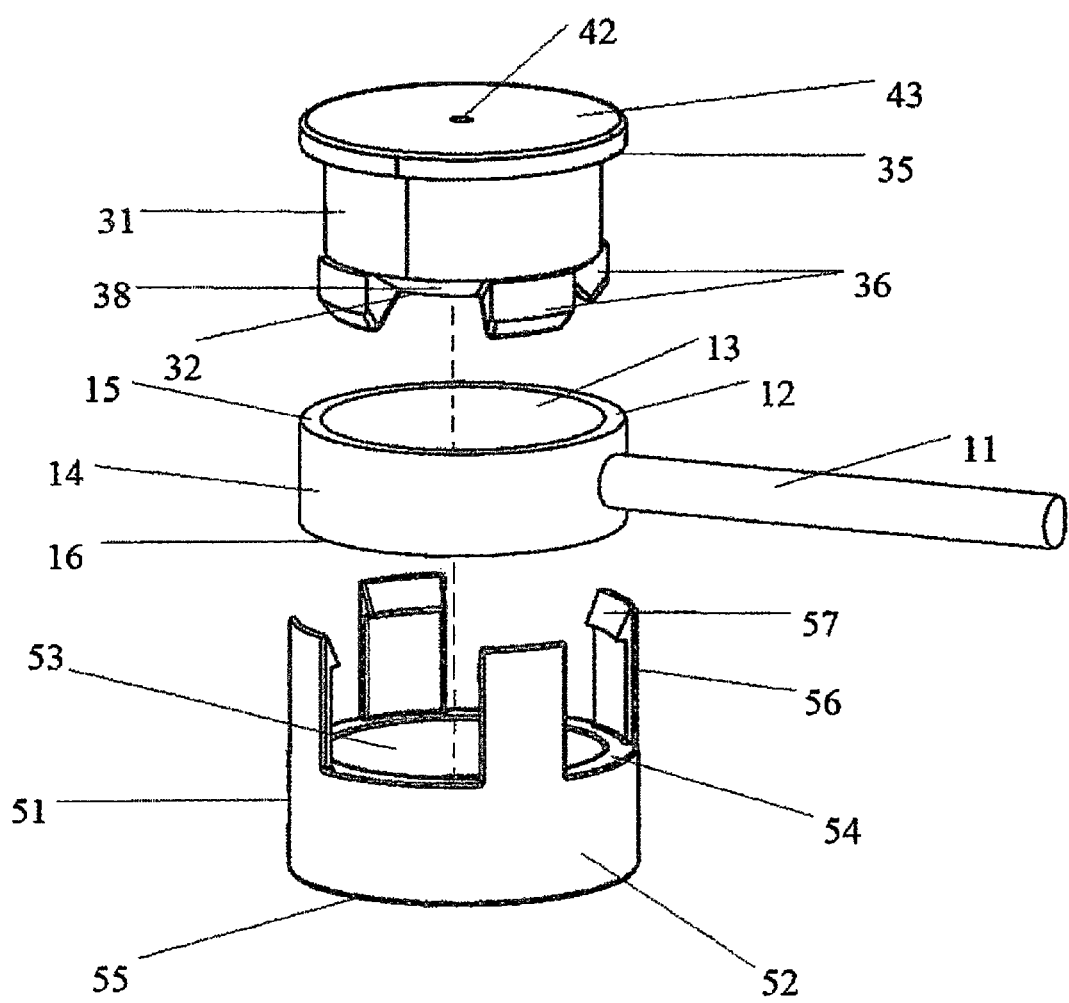
FIG. 10 is an exploded perspective illustration of an exemplary bushing, shift cable end, and installation tool.
Figure 11:
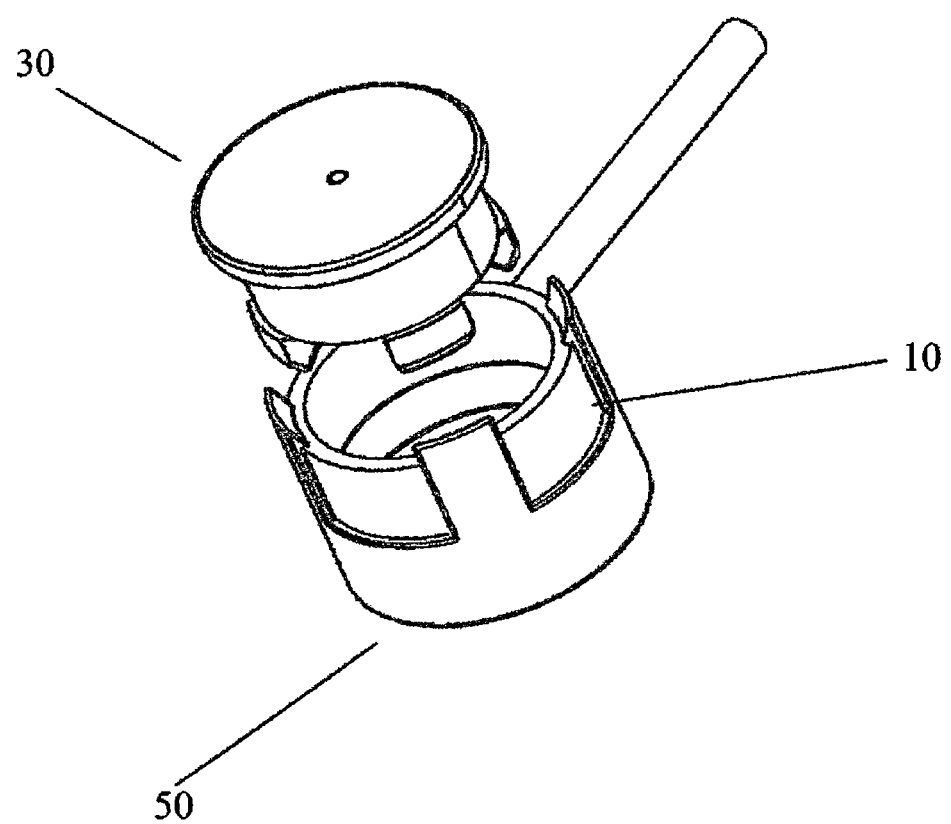
FIG. 11 is a perspective illustration of an exemplary bushing and a shift cable end seated in an exemplary installation tool.
Figure 12A:
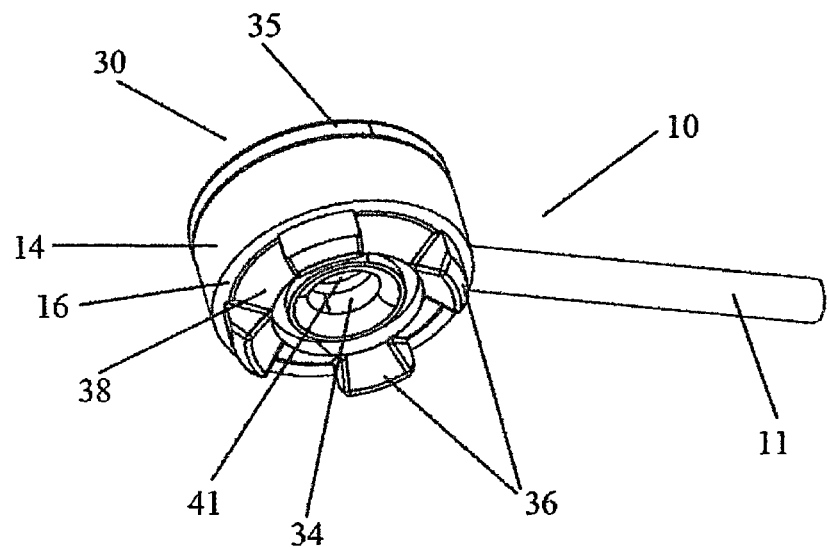
FIG. 12A is a perspective illustration of an exemplary bushing installed in a shift cable end.
Figure 12B:
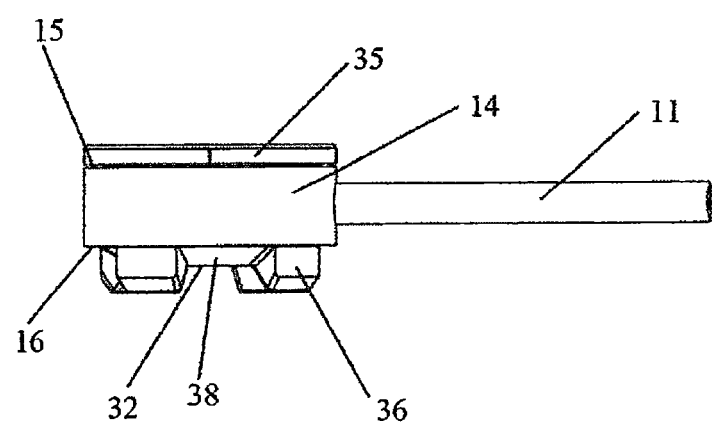
FIG. 12B is a side elevation illustration of an exemplary bushing installed in a shift cable end.
Figure 13:
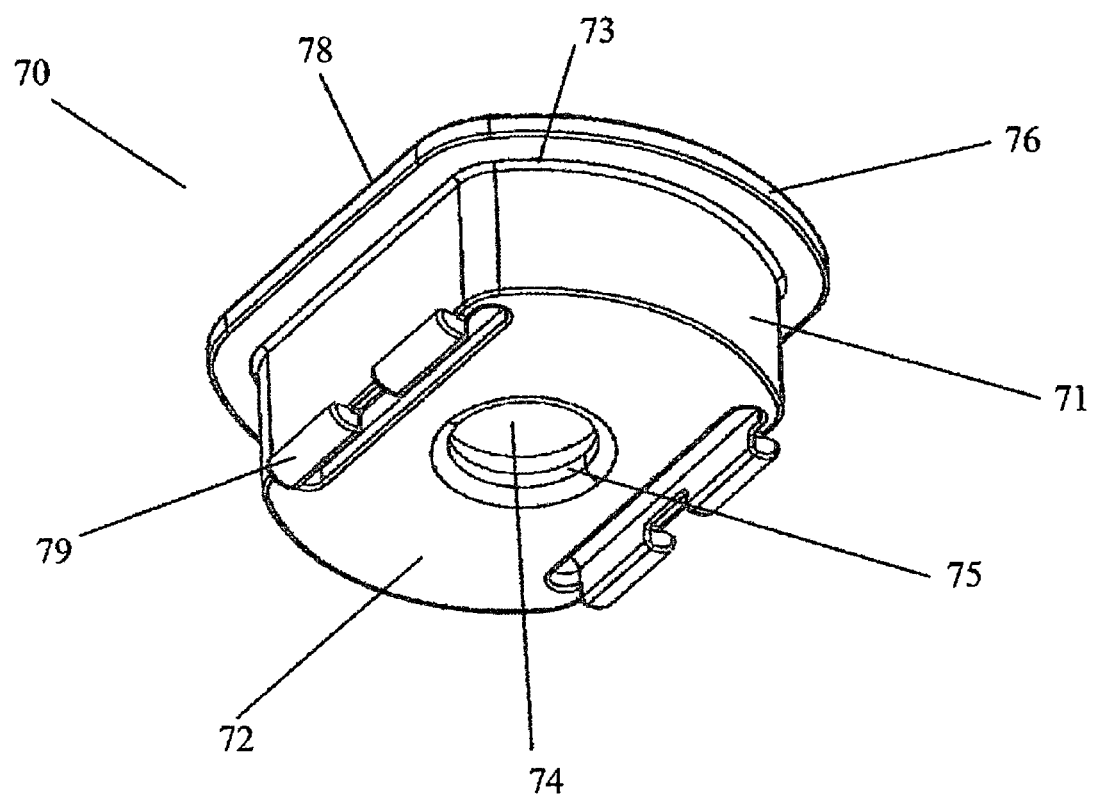
FIG. 13 is a perspective illustration of an exemplary bushing.
Figure 14A:
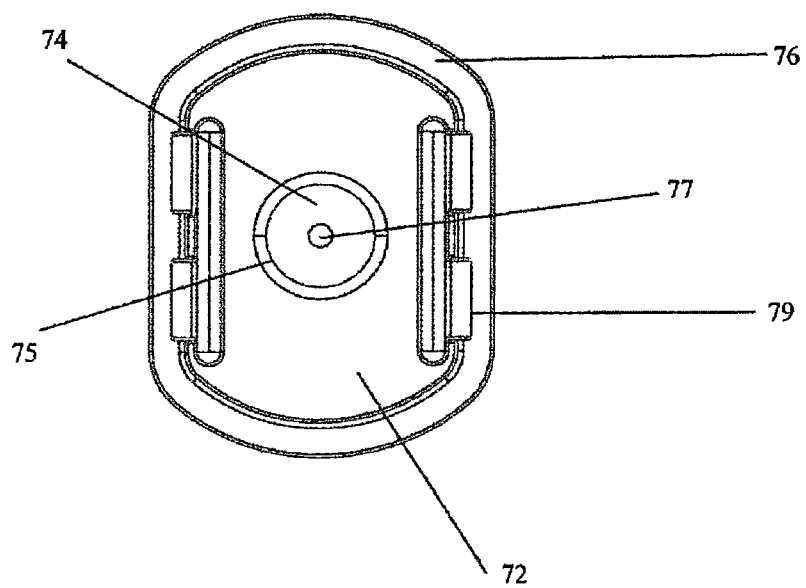
FIG. 14A is a bottom elevation illustration of an exemplary bushing.
Figure 14B:
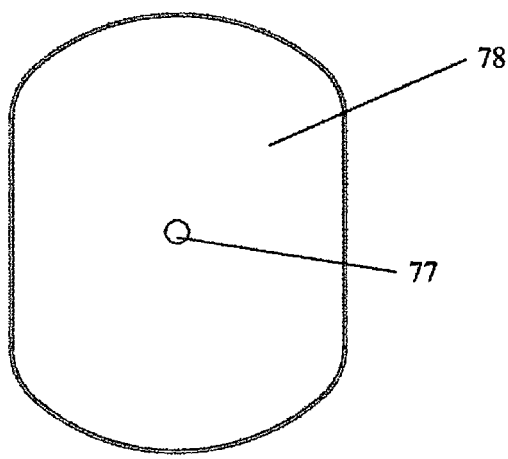
FIG. 14B is a top elevation illustration of an exemplary bushing.
Figure 15A:
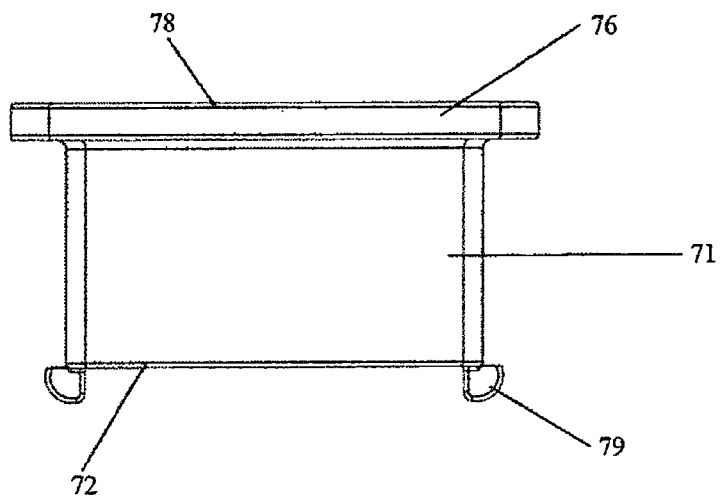
FIG. 15A is a front elevation illustration of an exemplary bushing.
Figure 15B:
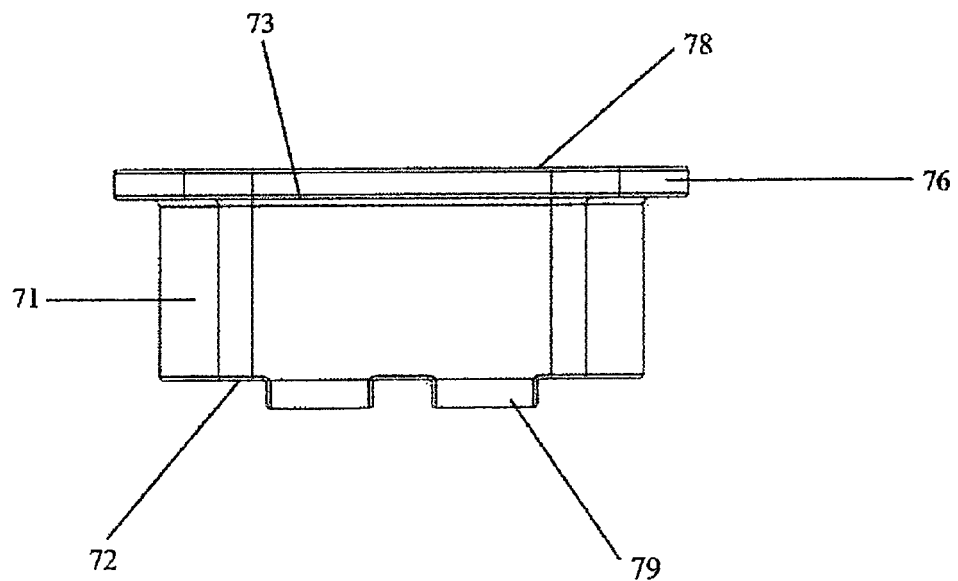
FIG. 15B is a side elevation illustration of an exemplary bushing.

Referring to FIG. 9, an exemplary protective tool 60 is illustrated. The protective tool 60 protects the seating member 35 from damage when a compressive force is applied to it during installation. The protective tool 60 is cap that fits over the seating member 35. In this particular embodiment, the protective tool 60 is comprised of cylindrical member 61 of a diameter greater than the diameter of the seating member 35. The cylindrical member 61 has a large aperture 62 of a diameter marginally greater than the diameter of the seating member 35, and an alignment member 63 extending vertically from the cylindrical member 61 and through the aperture 62. The alignment member 63 is identical in shape to the shaft 42. During installation, the protective tool 60 is placed over the seating member 35 by inserting the alignment member 63 into the shaft 42. A compressive force is then applied to the protective tool 60, and not the seating member during installation.

In accordance with the present invention, FIG. 10, FIG. 11, FIG. 12A and FIG. 12B illustrate an example of a method to replace damaged or degraded bushings in certain motor vehicles. The coupling member 12 is inserted into and seated on the installation tool 50 such that the bottom surface 16 of the coupling member 12 is seated on the top surface 54 of the cup 51, the arms 56 extend vertically along the coupling member 12 and the engagement members 57 extend horizontally over the top surface 15 of the coupling member 12. The protective tool 60 may then be placed over the bushing by aligning the alignment member 63 with the shaft 42. The bushing 30 is then inserted into the coupling member 12 by applying a compression force to the bottom surface 52 of the cup 51 and the protective tool 60. As the bushing 30 is inserted into the coupling member 12, the bushing 30 and the securing members 36 are radially compressed inward. As the seating member 35 approaches the top surface 15 of the coupling member 12, it makes contact with the engagement members 57 of the cup 51, pushing them outwards and causing them to disengage from the top surface 15 of the coupling member 12. Simultaneously, the securing members 36 pass beyond the bottom surface 16 of the coupling member 12 and expand such that the bases 37 of the securing members 36 extend horizontally outward across the bottom surface 16 of the coupling member 12. The installation tool 50 is then removed and a lubricant, such as grease, is applied to the ball portion 23 of the shift lever 20. The bushing 30 is then pressed down and over the ball portion 23 of the shift lever 20 such that the ball portion 23 is inserted through the coupling aperture 34 and into spherical cavity 41. Any air or grease escapes through the shaft 42 as the ball portion 23 of the shift lever 20 is fully seated within the spherical cavity 41.

FIG. 13, FIG. 14A, FIG. 14B, FIG. 15A and FIG. 15B illustrate various views of another embodiment of the bushing 70 for use in applications involving an oblong shift cable. The bushing 70 is comprised of a body 71 having a leading side 72 and a trailing side 73, said body 71 housing a spherical cavity 74 for receiving and engaging with the ball portion 23 of the shift lever 20, a coupling aperture 75 that runs from the leading side 72 of the body 71 to the spherical cavity 74, a seating member 76 attached to the trailing side 73 of the body 71, a shaft 77 that runs from the top surface 78 of the seating member 76 to the top of the spherical cavity 74, and a securing means, said securing means consisting of four securing members 79 extending outwards from the leading side 72 of the body 71.

The foregoing merely describes the present invention in an illustrative manner. The terminology employed is intended to be merely words of description, and not of limitation. It will thus be appreciated that that those skilled in the art will be able to make numerous modification and variations of the present invention in light of the above teachings. Such modifications and variations, while not illustrated or described herein, embody the principles of the present invention, and are within the spirit and scope of the appended claims.

The invention claimed is:

1. An apparatus for coupling a shift cable end and shift lever, said shift cable end comprising an elongated member carrying a coupling member with a coupling aperture, said shift lever comprising an elongated member having an arm portion and a ball portion, comprising:
 a bushing sized and shaped to fit within the coupling aperture, said bushing having a leading side and a trailing side, a coupling means for coupling the bushing with the ball portion of the shift lever, said coupling means comprising a cavity of similar size and shape to the ball portion of the shift lever within the bushing and a bore that runs from the leading side of the bushing to the cavity, a securing means for securing the bushing within the coupling aperture, said securing means comprising a seating member affixed to the trailing edge of the bushing, said seating member of a size and shape sufficient to cover the area of the trailing side of the bushing and coupling aperture and also extend horizontally beyond the bushing in all directions for engaging with the top of the coupling member, and securing members affixed to the leading side of the bushing that extend horizontally beyond the bushing and vertically beneath the coupling aperture for engaging with the bottom of the coupling member, and a pressure relief means for relieving pressure within the bushing's cavity, said pressure relief means comprising a shaft running from the cavity to the trailing edge of the bushing and through the seating member;
 an installation tool comprising a cup of a similar shape as the bushing and coupling aperture, an engagement means for engaging the bushing, said engagement means comprising arms extending vertically from the top of the cup, said arms having engagement members extending horizontally from the arms towards the center of the cup for sliding over and engaging the top of the coupling member of the shift lever; and
 a protective tool for protecting the bushing during installation, said protective tool comprising a body with a bore sized and shaped to fit over the seating member and an alignment means, said alignment means comprising an alignment member of similar size and shape to the shaft of the bushing, said alignment member extending vertically from the protective member and through the center of the bore.

2. The apparatus of claim 1 wherein the bushing has a compression means for allowing the bushing to be compressed as it is fitted into the coupling aperture, said compression means comprising a tapered edge around the leading side of the bushing.

3. The apparatus of claim 1 wherein in the bushing is cylindrical and of a height equal to the height of the coupling member, the cavity is spherical and of a diameter slightly greater than the diameter of the ball portion of the shift lever, the bore is cylindrical and of a diameter less than the diameter of the ball portion of the shift lever and greater than the diameter of the arm portion of the shift lever, the seating member is a disc of a diameter greater than the diameter of the bushing and the coupling aperture, the protruding members are tapered rectangular members, and the shaft is cylindrical.

4. The apparatus of claim 1 wherein the cup is cylindrical and the inner diameter of the cup is less than the diameter of the coupling aperture such that the coupling members sits atop the cup during installation.

5. The apparatus of claim 1 wherein the protective tool alignment member is cylindrical and of a diameter marginally less than the diameter of the shaft.

6. The apparatus of claim 1 wherein the bushing is an oblong member having a height equal to the height of the coupling member, the cavity is spherical and of a diameter greater than the diameter of the ball portion of the shift lever, the bore is cylindrical and of a diameter less than the diameter of the ball portion of the shift lever and greater than the diameter of the arm portion of the shift lever, the seating member is the same shape as the bushing and the coupling aperture, the protruding members are quarter cylinders and the shaft is cylindrical.

7. A method for operably coupling control cable end and shift lever, said control cable end having a coupling member with a coupling aperture, said shift lever having an elongated member with arm portion and a ball portion, comprising:
 providing a bushing sized and shaped to fit within the coupling aperture, said bushing having a leading side and a trailing side, a coupling means for coupling the bushing with the ball portion of the shift lever, said coupling means comprising a cavity of similar size and shape to the ball portion of the shift lever within the bushing and a bore that runs from the leading side of the bushing to the cavity, a securing means for securing the bushing within the coupling aperture, said securing means comprising a seating member affixed to the trailing edge of the bushing, said seating member of a size and shape sufficient to cover the area of the trailing side of the bushing and coupling aperture and also extend horizontally beyond the bushing in all directions for engaging with the top of the coupling member, and securing members affixed to the leading side of the bushing that extend horizontally beyond the bushing and vertically beneath the coupling aperture for engaging with the bottom of the coupling member, and a pressure relief means for relieving pressure within the bushing's cavity, said pressure relief means comprising a shaft running from the cavity to the trailing edge of the bushing and through the seating member;

providing an installation tool comprising a cup of a similar shape as the bushing and coupling aperture, an engagement means for engaging the bushing, said engagement means comprising arms extending vertically from the top of the cup, said arms having engagement members extending horizontally from the arms towards the center of the cup for sliding over and engaging the top of the coupling member of the shift lever;

providing a protective tool for protecting the bushing during installation, said protective tool comprising a body with a bore sized and shaped to fit over the seating member, and an alignment means, said alignment means comprising an alignment member of similar size and shape to the shaft of the bushing, said alignment member extending vertically from the protective member and through the center of the bore;

pressing the shift cable end into the cup such that the arms of the cup extend vertically along the exterior surface of the coupling member and the engagement members slide over and engage the top surface of the coupling member;

placing the protective tool over the seating member of the bushing by aligning the alignment member of the protective tool with the shaft of the bushing;

inserting the bushing into the coupling aperture by simultaneously applying a compressive force to the installation tool and protective tool until the bushing securing members are passed through the coupling aperture and the base, pushing the installation tool off of the coupling member, and expanding to extend horizontally outward and over the bottom surface of the coupling member;

removing the installation tool and protective tool;

applying lubricant to the ball portion of the shift lever; and pressing the bushing installed in the coupling member down and over the ball portion of the shift lever until the ball portion is passed through the bore and fitted into the cavity of the bushing.

* * * * *